US011870308B2

(12) United States Patent
Yang et al.

(10) Patent No.: US 11,870,308 B2
(45) Date of Patent: Jan. 9, 2024

(54) SYSTEM OF RADIALLY INSERTING A THERMISTOR INTO A STATOR CORE

(71) Applicant: BorgWarner Inc., Auburn Hills, MI (US)

(72) Inventors: Mingze Yang, Noblesville, IN (US); Brian Maskew, Noblesville, IN (US); Tim Sailors, Carmel, IN (US); Timothy J. Alfermann, Carmel, IN (US)

(73) Assignee: BORGWARNER INC., Auburn Hills, MI (US)

( * ) Notice: Subject to any disclaimer, the term of this patent is extended or adjusted under 35 U.S.C. 154(b) by 302 days.

(21) Appl. No.: 17/096,160

(22) Filed: Nov. 12, 2020

(65) Prior Publication Data

US 2021/0152056 A1 May 20, 2021

Related U.S. Application Data

(60) Provisional application No. 62/936,092, filed on Nov. 15, 2019.

(51) Int. Cl.
*H02K 11/25* (2016.01)
*H02K 3/04* (2006.01)
*H01C 7/00* (2006.01)

(52) U.S. Cl.
CPC ............. *H02K 11/25* (2016.01); *H01C 7/008* (2013.01); *H02K 3/04* (2013.01)

(58) Field of Classification Search
CPC . H02K 11/25; H02K 3/04; H02K 3/12; H01C 7/008

USPC ........................................................ 310/68 C
See application file for complete search history.

(56) References Cited

U.S. PATENT DOCUMENTS

| 3,131,322 | A | * | 4/1964 | Pleiss, Jr. | ............... | H02K 11/25 |
| | | | | | | 337/380 |
| 10,436,648 | B2 | | 10/2019 | Yoshihara et al. | | |
| 2012/0112580 | A1 | | 5/2012 | Sato et al. | | |
| 2016/0261175 | A1 | * | 9/2016 | Takamizawa | .......... | H02K 11/25 |
| 2017/0211988 | A1 | | 7/2017 | Jang et al. | | |
| 2021/0152056 | A1 | * | 5/2021 | Yang | ........................ | H02K 3/04 |
| 2022/0200410 | A1 | * | 6/2022 | Silvery | .................. | H02K 11/25 |

(Continued)

FOREIGN PATENT DOCUMENTS

| JP | 2003092858 | | * | 3/2003 |
| JP | 2012186902 | A | | 9/2012 |
| JP | 2012244703 | A | | 12/2012 |

(Continued)

OTHER PUBLICATIONS

International Search Report and Written Opinion for International Application No. PCT/US2020/060363; International Filing Date Nov. 13, 2020; Report dated Mar. 3, 2021 (pp. 1-9).

*Primary Examiner* — Ahmed Elnakib
(74) *Attorney, Agent, or Firm* — CANTOR COLBURN LLP

(57) ABSTRACT

A radially insertable thermistor assembly for installation into a stator having a plurality of stator windings. The radially insertable thermistor assembly includes a thermistor housing having one or more radially outwardly extending elements that extend through a void between two adjacent stator windings and being operable to connect to one of the stator and the plurality of stator windings, and a sensing element arranged at the thermistor housing.

18 Claims, 5 Drawing Sheets

(56) References Cited

U.S. PATENT DOCUMENTS

2022/0320971 A1* 10/2022 Akaba .................. G01K 1/08
2022/0337132 A1* 10/2022 Silvery ................ H02K 11/25

FOREIGN PATENT DOCUMENTS

JP           2018107889 A      7/2018
WO     WO 2021047711       *   3/2021   ............. H02K 11/25

* cited by examiner

SYSTEM OF RADIALLY INSERTING A THERMISTOR INTO A STATOR CORE

CROSS REFERENCE TO RELATED APPLICATIONS

This application claims the benefit of an earlier filing date from U.S. Provisional Application Ser. No. 62/936,092 filed Nov. 15, 2019, the entire disclosure of which is incorporated herein by reference.

BACKGROUND OF THE INVENTION

Exemplary embodiments pertain to the art of electric machines and, more particularly, to a system of radially inserting a thermistor into a stator core of an electric machine.

Thermistors are employed to monitor temperatures in various portions of an electric machine. In the case of an electric motor for a motor vehicle, one or more thermistors may be placed on a bus bar and one or more thermistors may be mounted on a stator. When mounting a thermistor to the bus bar, various molding techniques may be employed. For example, the thermistor may be molded with the bus bar or it may be mounted to the bus bar and over molded.

For the stator, the thermistor may be held in place by a harness or could be secured to the stator with heat shrink tubing. In some stator applications, the thermistor may be laced into the stator. When in place, the thermistor may be covered with varnish. Current techniques for mounting a thermistor to a stator are labor intensive and often result in an inadequate bond, inconsistent placement, and inadequate sensing such as if the thermistor loosens up before varnish application. Accordingly, the industry would welcome new techniques for mounting a thermistor to a stator core.

BRIEF DESCRIPTION OF THE INVENTION

Disclosed is a radially insertable thermistor assembly for installation into a stator having a plurality of stator windings. The radially insertable thermistor assembly includes a thermistor housing having one or more radially outwardly extending elements that extend through a void between two adjacent stator windings and being operable to connect to one of the stator and the plurality of stator windings, and a sensing element arranged at the thermistor housing.

Also disclosed is a stator including a stator core, and a plurality of stator windings supported by the stator core. The plurality of stator windings including a void. A radially insertable thermistor assembly is positioned in the void in contact with at least the adjacent ones of the plurality of stator windings. The radially insertable thermistor assembly includes a thermistor housing having one or more radially outwardly extending elements that extend through a void defined between adjacent stator winding and being operable to connect to one of the stator and the plurality of stator windings, and a sensing element arranged at the thermistor housing.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
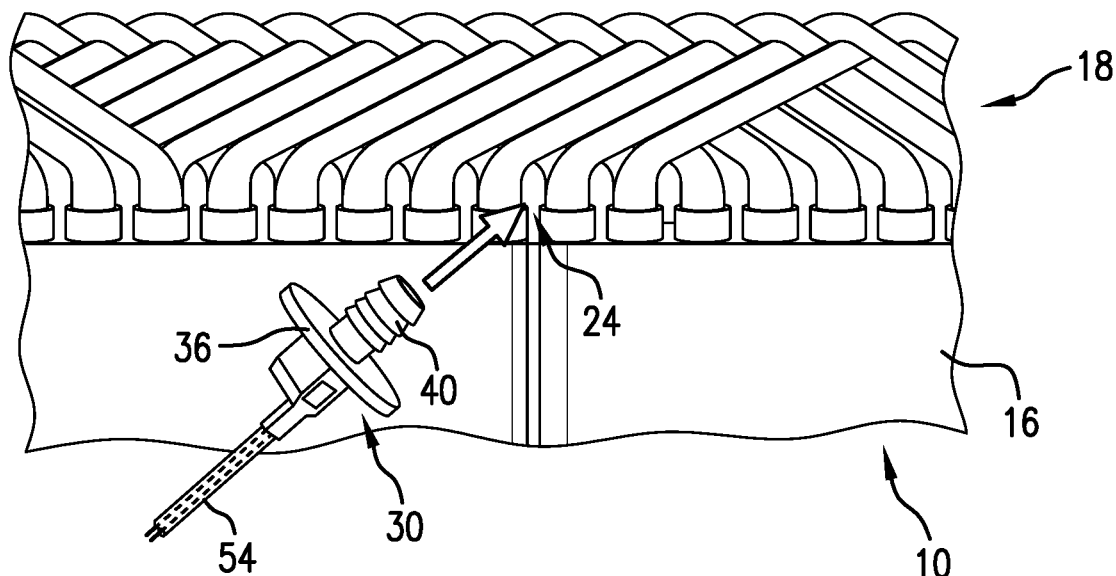
FIG. 1 depicts a stator and a radially insertable thermistor, in accordance with an aspect of an exemplary embodiment.

Referring to FIG. 1, a stator 10 is shown to include a stator body or core 16 and a plurality of stator windings 18. Plurality of stator windings 18 is supported by stator core 16 and includes a void 24. Void 24 is defined between adjacent ones of the plurality of stator windings 18. Void 24 extends radially through the plurality of stator windings 18 along a surface of stator core 16. A thermistor assembly 30 is installed into void 24. Thermistor assembly 30 includes a thermistor housing 36 having a projection 40 that extends radially through void 24. Projection 40 is in contact with at least the adjacent ones of the plurality of stator windings 18.

Figure 2:
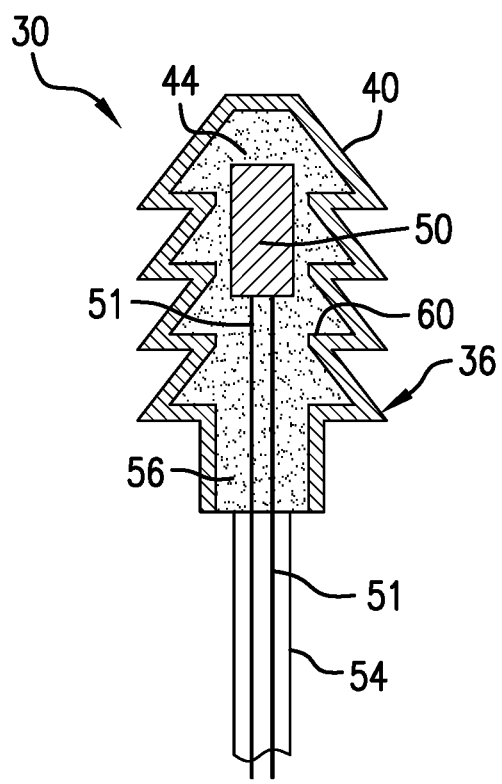
FIG. 2 depicts a glass view of the radially insertable thermistor of FIG. 1, in accordance with an aspect of an exemplary embodiment.

As shown in FIG. 2, thermistor housing 36 may include a hollow interior 44 that is receptive of one or more sensing elements 50 connected to signal wires, one of which is indicated at 51 that may be encased in an outer sheath 54. Sensing elements 50 may take the form of temperature sensing members such as thermistors, resistance temperature detectors, thermocouples and the like. An amount of filler material 56, such as epoxy, is introduced into hollow interior 44. Filler material 56 maintains a position of and also protects sensing elements 50. Projection 40 may include a number of barbs or radially outwardly extending elements 60 that are configured to grip windings 18 when thermistor assembly 30 is installed into void 24. Radially outwardly extending elements 60 may be flexible so as to readily deflect upon insertion or they may be rigid and thus require force to push thermistor housing 36 into void 24.

At this point, it should be understood that thermistor housing 36 may be formed from plastic and injection molded onto sensing elements 50. Additionally, sensing elements 50 may be part of an assembly (not shown) that is press and/or snap-fit into thermistor housing 36. In another embodiment, thermistor assembly 30 may include more than one thermistor housing 36 and associated sensing elements 50 that are arranged in different ones of void 24. Further, it should be understood that once installed, housing may be held in place not only by barbs 60 but also by a layer of varnish and/or an adhesive.

Figure 3:
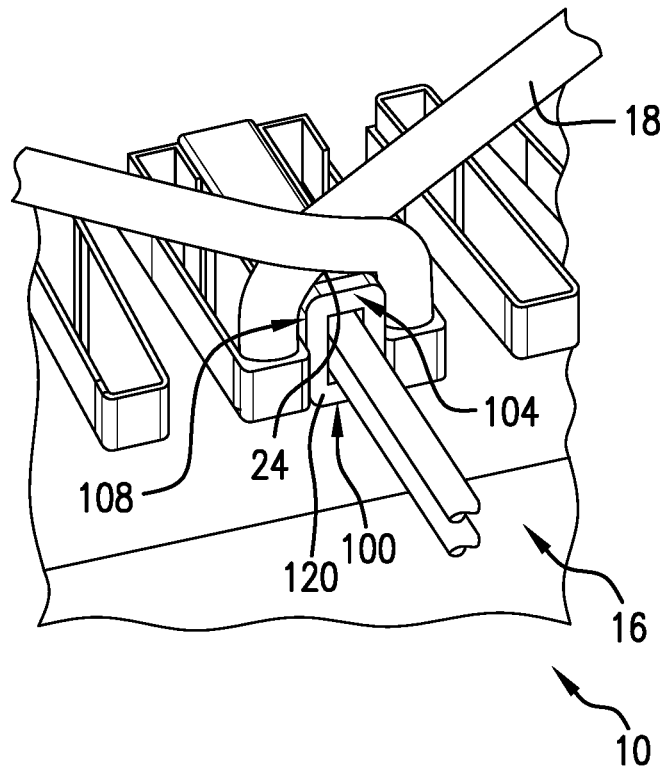
FIG. 3 depicts a stator including a radially insertable thermistor, in accordance with another aspect of an exemplary embodiment.
Figure 4:
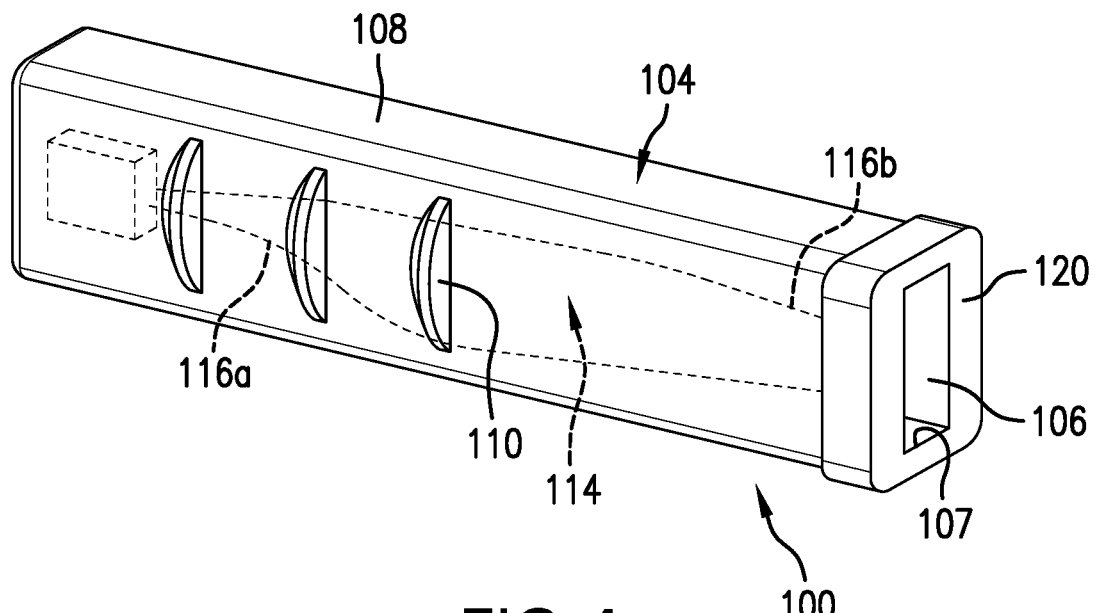
FIG. 4 depicts a side view of a portion of the radially insertable thermistor of FIG. 3, in accordance with an aspect of an exemplary embodiment.
Figure 5:
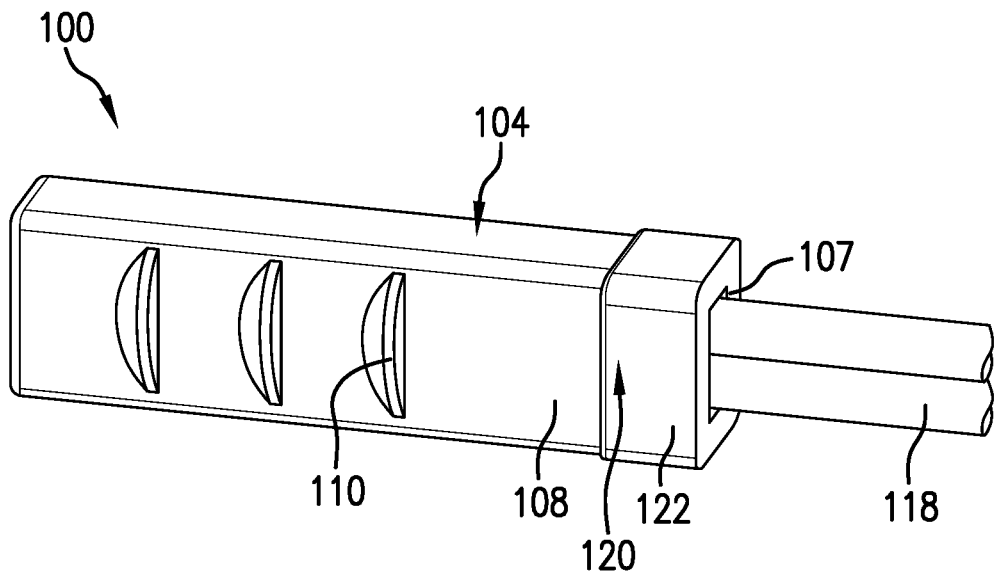
FIG. 5 depicts the radially insertable thermistor of FIG. 4 showing a sensing cable extending from a thermistor housing, in accordance with an exemplary aspect.

Reference will now follow to FIGS. 3-5, wherein like reference numbers represent corresponding parts in the respective views, in describing a thermistor housing 100 in accordance with another aspect of an exemplary embodiment. Thermistor housing 100 includes a body 104 having a hollow interior 106 defined by an inner surface (not separately labeled) having an opening 107 and an outer surface 108. When installed in stator 10, outer surface 108 is in contact with at least the adjacent ones of the plurality of stator windings 18. A plurality of outwardly extending elements, one of which is shown at 110 may be provided on outer surface 108. In this manner, body 104 may constitute a projection that is interested into void 24. Outwardly extending elements 110 engage with at least the adjacent ones of the plurality of stator windings 18 to affix thermistor housing 100 to stator 10.

Sensing elements, one of which is indicated at 114 may be installed into hollow interior 106. Sensing elements 114 may take the form of temperature sensing members that are connected to sensor leads 116a and 116b that extend from opening 107 as a sensing cable such as shown at 118 in FIG. 5. Once installed, hollow interior 106 may be filled by a filler material such as, for example, epoxy. FIG. 5 also depicts a stop member 120 that takes the form of first and second outwardly extending projections, one of which is indicated at 122. In an embodiment, stop member 120 may extend entirely about housing body 104. Stop member 120 limits insertion depth of thermistor housing 100 into void 24. That is, stop member 120 engages with adjacent ones of windings 18 to limit insertion depth of thermistor housing 100. In this manner, stop member 120 and outwardly extending elements 110 prevent thermistor housing 100 from being inserted deeper into stator 10.

Figure 6:
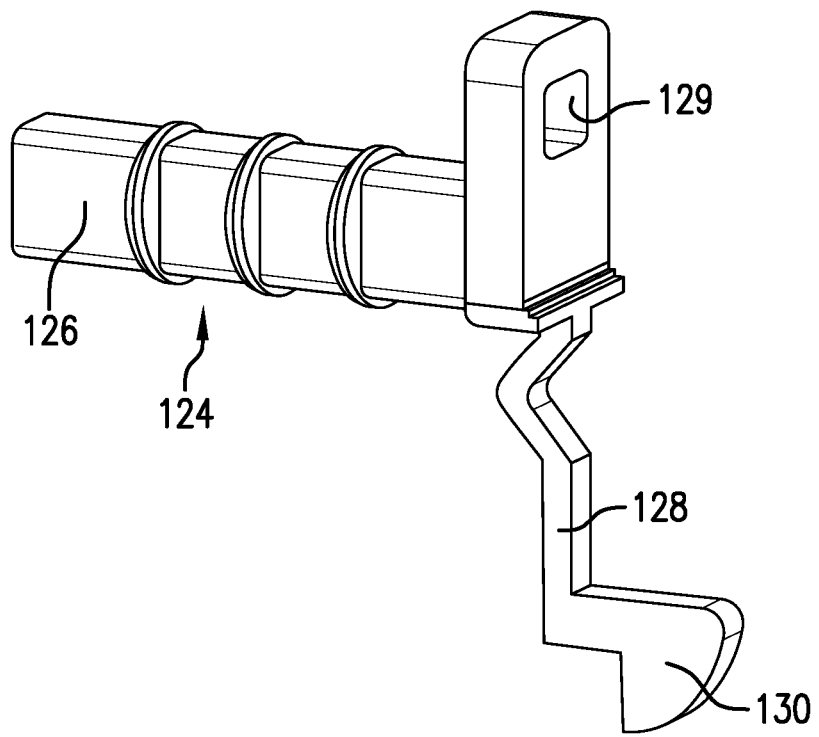
FIG. 6 depicts the radially insertable clip that aids in supporting thermistor wires, in accordance with another aspect of an exemplary embodiment.

In an exemplary aspect, a clip member 124, such as shown in FIG. 6, may be installed in windings 18 to support sensing cable 118. Clip member 124 may include a housing 126 and a cable support which may take the form of a flexible clip element 128 that may be bent or folded about sensing cable 118. In an embodiment, housing 126 includes an opening 129 that is receptive of a hook element 130 on clip element 128. Hook element 130 engages with housing 126 to retain sensing cable 118. In this regard, thermistor housing 100 and clip member 124 form a thermistor assembly for stator 10.

Figure 7:
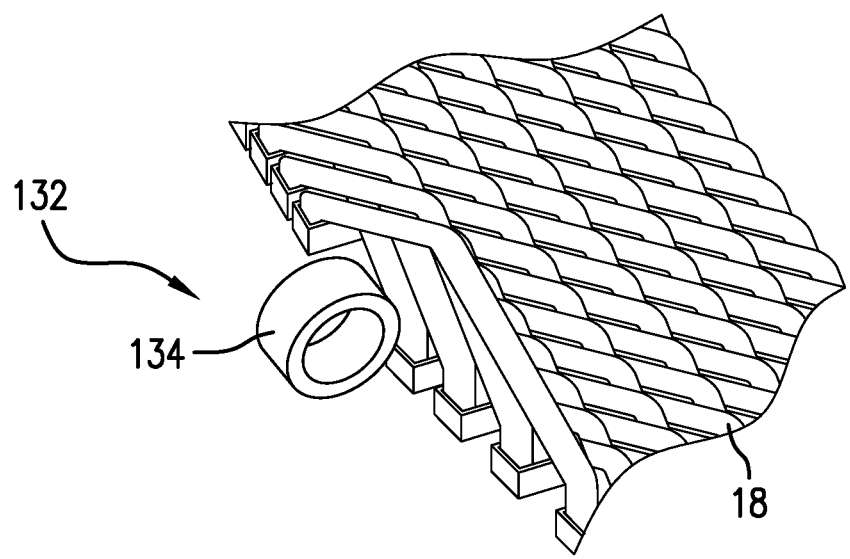
FIG. 7 depicts the radially insertable clip, in accordance with another aspect of an exemplary embodiment.
Figure 8:
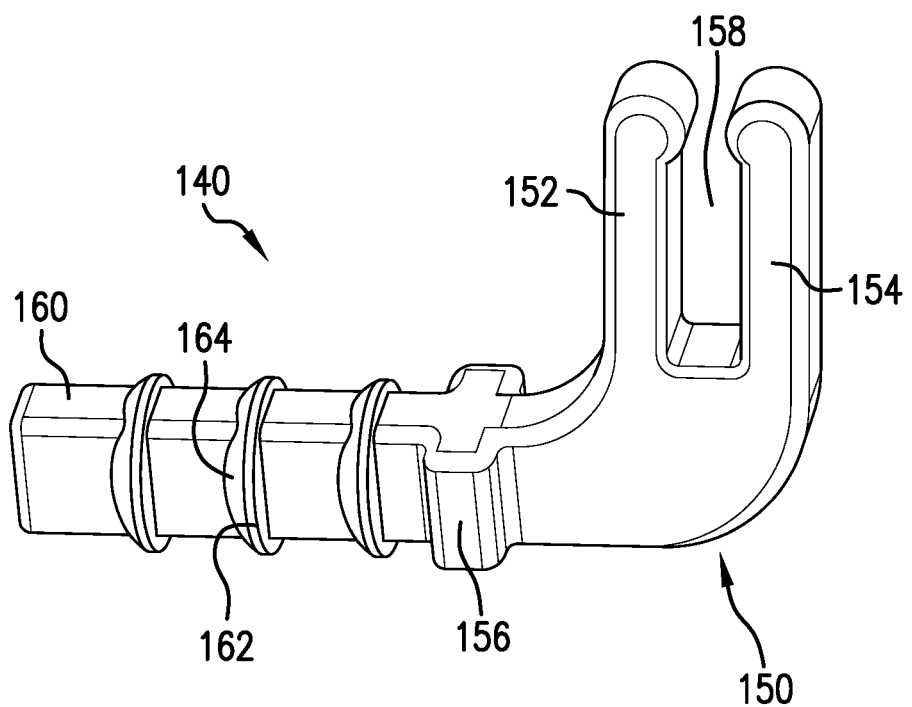
FIG. 8 depicts a radially insertable clip, in accordance with another exemplary aspect

FIG. 7 depicts a clip member 132 in accordance with another exemplary aspect. Clip member 132 includes a cable support 134 that retains, for example, sensing cable 118. FIG. 8 depicts a clip member 140 in accordance with another exemplary aspect. Clip member 140 includes a cable support 150 including first and second support members 152 and 154 may extend from a stop member 156. First and second support members 152 and 154 are spaced from one another by a gap 158 that may receive and support, for example, sensing cable 118. Clip member 140 may also include a projection 160 having a number of outwardly projecting elements 162. Projection 160 extends into void 24 with outwardly projecting elements 162 engaging with stator windings 18. Outwardly projecting elements 162 may include an angled surface 164 that promotes insertion into void 124 while, at the same time, hindering removal.

Figure 9:
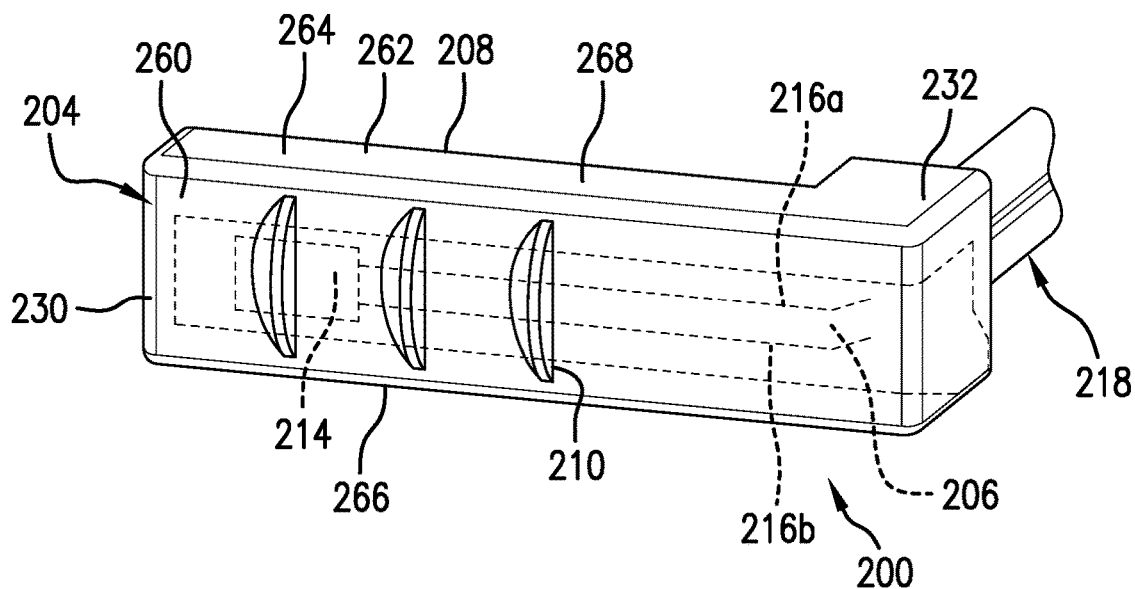
FIG. 9 depicts a side view of a radially insertable thermistor having an angled cable outlet, in accordance with an exemplary aspect.
Figure 10:
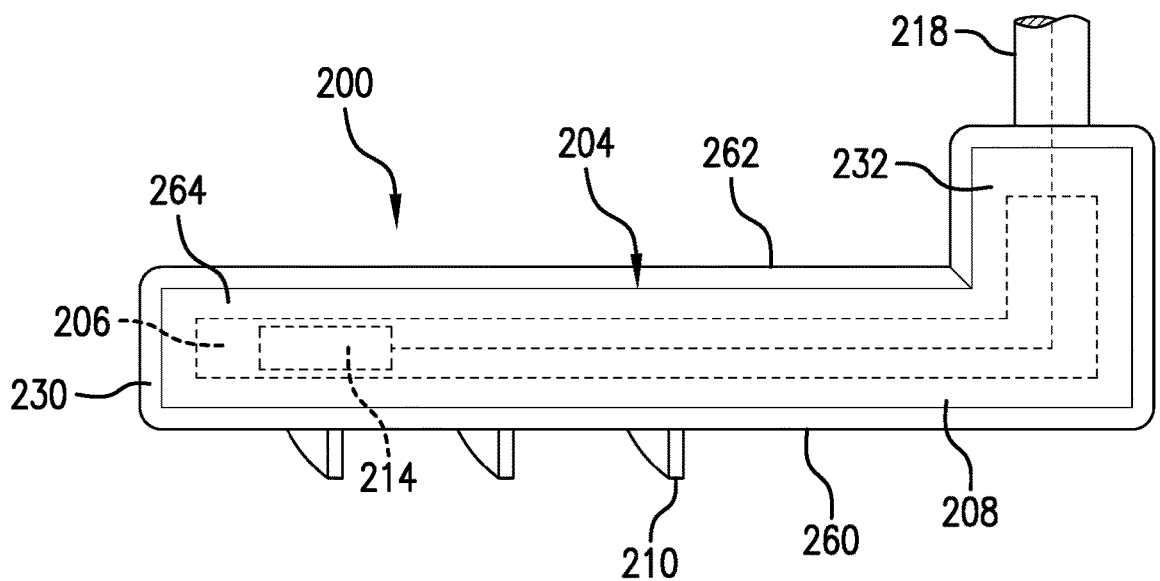
FIG. 10 depicts a top view of the radially insertable thermistor of FIG. 8, in accordance with an exemplary aspect.

Reference will now follow to FIGS. 9 and 10 in describing a thermistor housing 200 in accordance with another exemplary aspect. Housing 200 includes a body 204 having a hollow interior 206 defined by an inner surface (not separately labeled) and an outer surface 208. A plurality of outwardly extending elements, one of which is shown at 210 may be provided on one side of outer surface 208. Alternatively, outwardly extending elements 210 may be provided on multiple sides of outer surface 208. In a manner similar to that discussed herein, outwardly extending elements 110 secure body 204 in void 24. In this manner, housing 200 may constitute a projection that is interested into void 24. Sensing elements, one of which is indicated at 214 may be installed into hollow interior 206. Once installed, hollow interior 206 may be filled with a filler material such as, for example, epoxy. Sensing elements 214 may be connected to sensor leads 216a and 216b that extend from housing 200 as a sensing cable 218.

In an embodiment, sensing elements 214 are disposed in a sensing portion 230 and sensing cable 218 extends from a cable outlet portion 232. Cable outlet portion 232 extends from sensing portion 230 at a substantially perpendicular angle. In this manner, cable outlet portion 232 may alleviate stresses on cable 218. The geometry of housing 200 eliminating any need for a sharp bend in cable 218 to create a desired routing to a controller.

In an embodiment, outwardly extending members 210 are provided on a single face of outer surface 208. Specifically, when installed in void 24, housing 200 includes an upper face 260, a lower face 262, a first outer face 264, and a radially outer face 266. Outwardly extending members 210 are provided on upper face 260 such that first and second outer faces 264 and 266 are in direct contact with stator windings 18. In this manner, heat transfer to housing 200 may be enhanced.

At this point, it should be understood that the exemplary embodiments provide a system of radially inserting a thermistor into a stator. The thermistor is arranged in a housing having a protrusion that may extend through a void between adjacent stator windings. The protrusion may include barbs that grip the winding to maintain a position of the housing.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A radially insertable thermistor assembly for installation into a stator having a plurality of stator windings, the radially insertable thermistor assembly comprising:
a thermistor housing including a sensing portion and a cable outlet portion, the cable outlet portion extending substantially perpendicularly from the sensing portion, the housing having one or more outwardly extending elements that extend through a void defined between a crossing of two adjacent stator windings and being operable to connect to one of the stator and the plurality of stator windings, and a sensing element arranged at the thermistor housing.

2. The radially insertable thermistor assembly according to claim 1, wherein the thermistor housing includes a body having a hollow interior that is receptive of the sensing element.

3. The radially insertable thermistor assembly according to claim 2, wherein the sensing element comprises a temperature sensing member.

4. The radially insertable thermistor assembly according to claim 2, wherein the sensing element is encased in a filler material that is provided in the hollow interior.

5. The radially insertable thermistor assembly according to claim 2, wherein the thermistor housing includes a projection having an outer surface and a plurality of radially outwardly extending elements extending from the outer surface.

6. The radially insertable thermistor assembly according to claim 5, wherein the plurality of radially outwardly extending elements are flexible.

7. The radially insertable thermistor assembly according to claim 5, wherein the thermistor housing includes an upper face, a lower face, a first outer face and a second outer face, the plurality of outwardly extending elements being provided on only one of the upper face, the lower face, the first outer face and the second outer face.

8. The radially insertable thermistor assembly according to claim 7, wherein the plurality of outwardly extending elements are provided on the upper face.

9. The radially insertable thermistor assembly according to claim 2, wherein the hollow interior includes an opening that extends through the body, and a sensing cable that extends from the opening.

10. The radially insertable thermistor assembly according to claim 1, further comprising: a clip member including a cable support, the clip member being insertable between adjacent ones of the plurality of stator windings.

11. The radially insertable thermistor assembly according to claim 10, wherein the cable support includes a flexible clip element.

12. A stator comprising:
a stator core;
a plurality of stator windings supported by the stator core, the plurality of stator windings including a void; and
a radially insertable thermistor assembly positioned in the void in contact with at least the adjacent ones of the plurality of stator windings, the radially insertable thermistor assembly comprising:
a thermistor housing including a sensing portion and a cable outlet portion, the cable outlet portion extending substantially perpendicularly from the sensing portion, the housing including a first end, a second end, an intermediate portion defined between the first end and the second end, and a plurality of outwardly extending elements projecting outwardly of the intermediate portion, the first end and the intermediate portion extending into the void defined between a crossing of two adjacent stator windings, the thermistor housing connecting to one of the stator and the plurality of stator windings, and a sensing element arranged at the thermistor housing.

13. The stator according to claim 12, wherein the thermistor housing includes a body having a hollow interior that is receptive of the sensing element.

14. The stator according to claim 13, wherein the sensing element comprises a temperature sensing member.

15. The stator according to claim 13, wherein the sensing element is encased in a filler material that is provided in the hollow interior.

16. The stator according to claim 13, wherein the thermistor housing includes a projection having an outer surface and a plurality of outwardly extending elements extending from the outer surface.

17. The stator according to claim 16, wherein the thermistor housing includes an upper face, a lower face, a first outer face and a second outer face, the plurality of outwardly extending elements being provided on only one of the upper face, the lower face, the first outer face and the second outer face.

18. The stator according to claim 13, further comprising: a clip member including a cable support, the clip member being insertable between adjacent ones of the plurality of stator windings.

* * * * *